(12) United States Patent
Khokhar (10) Patent No.: US 12,092,228 B2
(45) Date of Patent: Sep. 17, 2024

(54) DIVERTER VALVE ASSEMBLY

(71) Applicant: Cameron International Corporation, Houston, TX (US)

(72) Inventor: Aleem Aman Khokhar, Spring, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 18/042,373

(22) PCT Filed: Sep. 1, 2021

(86) PCT No.: PCT/US2021/048673
§ 371 (c)(1),
(2) Date: Feb. 21, 2023

(87) PCT Pub. No.: WO2022/051367
PCT Pub. Date: Mar. 10, 2022

(65) Prior Publication Data
US 2023/0332695 A1    Oct. 19, 2023

Related U.S. Application Data

(60) Provisional application No. 63/074,104, filed on Sep. 3, 2020.

(51) Int. Cl.
*F16K 11/085* (2006.01)
*F16K 27/06* (2006.01)

(52) U.S. Cl.
CPC .......... *F16K 11/085* (2013.01); *F16K 27/065* (2013.01); *Y10T 137/86501* (2015.04); *Y10T 137/86871* (2015.04)

(58) Field of Classification Search
CPC ..... Y10T 137/86863; Y10T 137/86501; Y10T 137/86871; Y10T 137/87804; Y10T 137/8782; F16K 11/085
See application file for complete search history.

(56) References Cited

U.S. PATENT DOCUMENTS 4,022,427 A     5/1977  Read
4,967,797 A  * 11/1990  Manska .............. A61M 39/223
                                                    604/83

(Continued)

FOREIGN PATENT DOCUMENTS

EP          1489342 A1    12/2004

OTHER PUBLICATIONS

International Search Report and Written Opionion issued in the PCT Application PCT/US2021/048673, dated Nov. 29, 2021 (12 pages).

*Primary Examiner* — Robert K Arundale
(74) *Attorney, Agent, or Firm* — Jeffrey D. Frantz (57) ABSTRACT

A diverter valve assembly includes a diverter valve. The diverter valve includes a housing having an inlet, multiple destination outlets, and a subsequent diverter valve outlet. The diverter valve also includes a rotary element disposed within the housing. The rotary element has an inlet, one or more target destination outlets, and a subsequent diverter valve outlet. Furthermore, the inlet of the rotary element is fluidly coupled to the inlet of the housing, the subsequent diverter valve outlet of the rotary element is fluidly coupled to the subsequent diverter valve outlet of the housing, and the rotary element is configured to rotate to selectively fluidly couple the one or more target destination outlets of the rotary element to one or more respective destination outlets of the housing.

17 Claims, 3 Drawing Sheets

(56) References Cited

U.S. PATENT DOCUMENTS

| | | | |
|---|---|---|---|
| 5,123,449 A | 6/1992 | Nowicki | |
| 5,927,330 A * | 7/1999 | Minton | F16K 11/085 |
| | | | 251/367 |
| 6,196,266 B1 | 3/2001 | Breda | |
| 2001/0013370 A1* | 8/2001 | Loo | A61M 39/223 |
| | | | 137/625.47 |
| 2004/0041120 A1* | 3/2004 | Haughom | E21B 43/12 |
| | | | 251/344 |
| 2005/0092378 A1* | 5/2005 | Wu | F16K 11/085 |
| | | | 137/625.47 |
| 2007/0044856 A1 | 3/2007 | Bonior | |
| 2009/0095353 A1 | 4/2009 | Arsin | |
| 2011/0272049 A1* | 11/2011 | Jorgensen | F16K 11/0856 |
| | | | 137/625.47 |

* cited by examiner

DIVERTER VALVE ASSEMBLY

CROSS-REFERENCE TO RELATED APPLICATION

This application is the National Stage Entry of International Application No. PCT/US2021/048673, filed Sep. 1, 2021, which claims priority from and the benefit of U.S. Provisional Application No. 63/074,104, entitled "DIVERTER VALVE ASSEMBLY", filed Sep. 3, 2020, which is hereby incorporated by reference in its entirety.

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies search for and extract oil, natural gas, and other subterranean resources from the earth. Once a desired subterranean resource is discovered, drilling and production systems are employed to access and extract the resource. These systems may be located onshore or offshore depending on the location of a desired resource. For example, in surface operations, hydrocarbon fluids such as oil and natural gas are obtained from a subterranean geologic formation, referred to as a reservoir, by drilling a well that penetrates the hydrocarbon-bearing geologic formation. In various surface applications (e.g., fracking applications, etc.) and other well applications, a diverter valve may be used to direct fluid flow from a single source to a selected target destination. For example, a diverter valve may include a single inlet and three outlets. The inlet may receive fluid from the single source, and each outlet may be fluidly coupled to a respective destination (e.g., via a respective conduit). The diverter valve may be controlled to selectively direct the fluid from the inlet to one selected outlet, thereby establishing fluid flow from the single source to a selected target destination. Unfortunately, such a diverter valve may be incapable of selectively directing fluid from the single source to multiple selected target destinations concurrently. In addition, designing and manufacturing a valve assembly to selectively direct fluid from the single source to multiple selected target destinations concurrently may be complex and costly.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
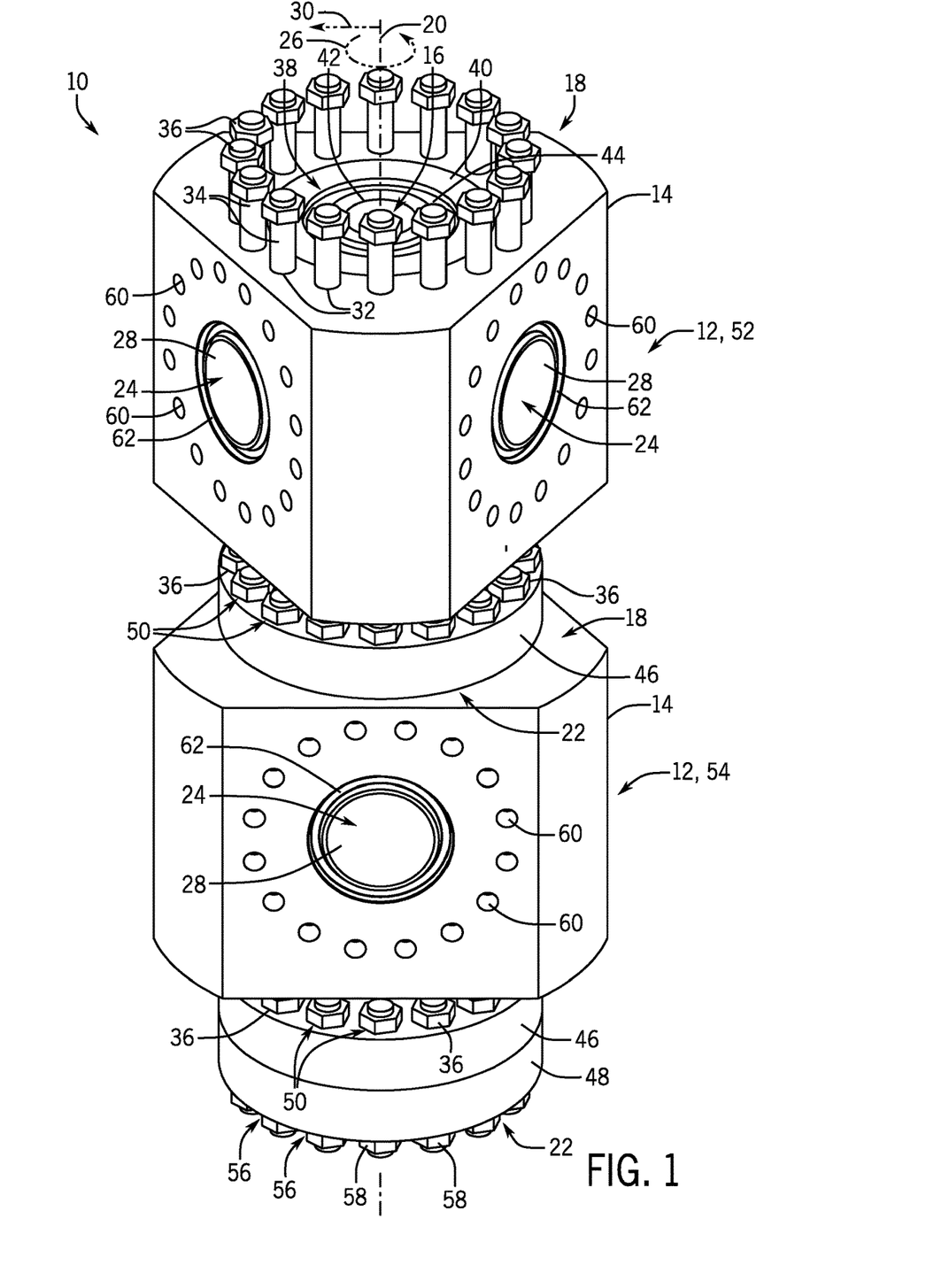
FIG. 1 is a perspective view of an embodiment of a diverter valve assembly.

FIG. 1 is a perspective view of an embodiment of a diverter valve assembly 10. In the illustrated embodiment, the diverter valve assembly 10 includes a first diverter valve 12 and a second diverter valve 12 coupled to one another. Each diverter valve includes a housing 14 and a rotary element disposed within the housing 14. As illustrated, the housing 14 has an inlet 16 positioned at a first longitudinal end 18 of the housing 14 (e.g., first end of the housing along a longitudinal axis 20 of the diverter valve 12/diverter valve assembly 10). In addition, the housing 14 has a subsequent diverter valve outlet positioned at a second longitudinal end 22 of the housing 14 (e.g., second end of the housing along the longitudinal axis 20), opposite the first longitudinal end 18. The housing 14 also includes multiple destination outlets 24 disposed circumferentially about the longitudinal axis 20 (e.g., disposed along a circumferential axis 26). In the illustrated embodiment, each housing 14 includes three destination outlets 24 substantially equally distributed along the circumferential axis 26. However, in other embodiments, at least one housing may include more or fewer destination outlets (e.g., 2, 4, 5, 6, 7, 8, or more), and/or the destination outlets of at least one housing may have non-uniform spacing along the circumferential axis. Furthermore, each destination outlet 24 is formed at the end of a respective destination flow path 28 through the respective housing 14. In the illustrated embodiment, each destination flow path 28 extends along a radial axis 30 of the diverter valve assembly 10. However, in other embodiments, at least one destination flow path may extend along another suitable direction and/or route to the destination outlet. For example, at least one destination flow path may extend along a curved path, at least one destination flow path may be angled relative to the radial axis, at least one destination flow path may include multiple sections that are angled relative to one another, or a combination thereof.

As discussed in detail below, a rotary element is disposed within each housing 14. The rotary element has an inlet, a target destination outlet, and a subsequent diverter valve outlet. The inlet of the rotary element is fluidly coupled to the inlet of the housing 14 (e.g., the inlet of the rotary element is substantially aligned with the inlet of the housing 14 along the longitudinal axis 20), and the subsequent diverter valve outlet of the rotary element is fluidly coupled to the subsequent rotary valve outlet of the housing 14 (e.g., the subsequent diverter valve outlet of the rotary element is substantially aligned with the subsequent rotary valve outlet of the housing 14 along the longitudinal axis 20). In addition, the rotary element is configured to rotate about the longitudinal axis 20 (e.g., along the circumferential axis 26) to selectively fluidly couple (e.g., align) the target destination outlet of the rotary element with a respective destination outlet 24 of the respective housing 14.

In the illustrated embodiment, each housing 14 has multiple threaded recesses 32 at the first longitudinal end 18 of the housing 14. As illustrated, each threaded recess 32 extends along the longitudinal axis 20, and each threaded recess 32 is configured to receive a respective threaded shaft 34. The threaded shafts 34 facilitate coupling the housing 14 to a flange of a fluid source/fluid inlet conduit or to a flange of a previous diverter valve, as discussed in detail below. The flange may have multiple apertures, and the threaded shafts 34 may extend through the apertures of the flange while the flange is engaged with the housing 14. A nut 36 may be engaged with each threaded shaft 34 to couple the flange to the housing 14. In the illustrated embodiment, the threaded recesses 32 are distributed about the longitudinal axis 20 in a circular pattern. However, in other embodiments, the threaded recesses may be arranged in any other suitable pattern (e.g., corresponding to the pattern of the apertures of the respective flange). Furthermore, while each threaded recess extends along the longitudinal axis in the illustrated embodiment, in other embodiments, at least one threaded recess may extend along another suitable direction (e.g., angled with respect to the longitudinal axis). In addition, while threaded recesses in the housing are used to couple the fluid source/fluid inlet conduit or previous diverter valve to the housing in the illustrated embodiment, in other embodiments, other and/or additional connection system(s) may be used to couple the fluid source/fluid inlet conduit or previous diverter valve to the housing. For example, in certain embodiments, the housing may include a flange positioned at the first longitudinal end of the housing, and the flange may be configured to engage a corresponding flange of the fluid source/fluid inlet conduit or previous diverter valve. The flange may also be configured to engage a body of the fluid source or the housing of the previous diverter valve.

In the illustrated embodiment, the inlet 16 of each housing 14 is formed at the end of an inlet flow path 38 through the housing 14. Furthermore, in the illustrated embodiment, the inlet flow path 38 extends along the longitudinal axis 20 of the diverter valve assembly 10. However, in other embodiments, the inlet flow path may extend along another suitable direction and/or route to the inlet. For example, the inlet flow path may extend along a curved path, the inlet flow path may be angled relative to the longitudinal axis, the inlet flow path may include multiple sections that are angled relative to one another, or a combination thereof. In the illustrated embodiment, each diverter valve 12 includes a first end cap 40 disposed within the inlet flow path 38. The first end cap 40 is configured to block movement of the rotary element along the longitudinal axis 20 through the inlet 16 of the housing 14 and to facilitate rotation of the rotary element about the longitudinal axis 20. In addition, the first end cap 40 includes a flow passage 42 extending from the inlet of the housing 14 to the inlet of the rotary element. The flow passage 42 is configured to direct fluid received at the inlet 16 of the housing 14 (e.g., from the fluid source) to the inlet of the rotary element. In the illustrated embodiment, the first end cap 40 has an annular recess 44 configured to receive a seal (e.g., O-ring, etc.). The seal is configured to substantially block fluid from flowing out of the interface between the housing and the fluid source/fluid inlet conduit or the previous diverter valve. While the first end cap 40 includes the annular recess 44 in the illustrated embodiment, in other embodiments, the annular recess may be omitted. Furthermore, in certain embodiments, a gasket may be disposed between the housing and the fluid source/fluid inlet conduit or the previous diverter valve (e.g., alone or in combination with the seal disposed within the annular recess of the first end cap) to substantially block fluid from flowing out of the interface between the housing and the fluid source/fluid inlet conduit or the previous diverter valve. Furthermore, in certain embodiments, the first end cap may be omitted and movement of the rotary element through the inlet of the housing may be blocked by other suitable device(s)/element(s) (e.g., a protrusion of the rotary element engaged with an annular recess in the housing along the inlet flow path, an annular ridge extending inwardly from the inlet flow path along the radial axis, etc.). In such embodiments, fluid may flow from the inlet of the housing to the inlet of the rotary element via the inlet flow path of the housing.

In the illustrated embodiment, the housing 14 of each diverter valve 12 includes a flange 46 that forms the second longitudinal end 22 of the housing 14. The flange 46 is configured to facilitate coupling between the housing 14 and a subsequent diverter valve or a blind flange 48. Coupling the flange 46 to the housing of a subsequent diverter valve establishes a fluid connection between the subsequent diverter valve outlet of the housing of the previous diverter valve and the inlet of the housing of the subsequent diverter valve. In the illustrated embodiment, the flange 46 includes multiple apertures 50 configured to receive fasteners that couple the flange to the subsequent diverter valve or to the blind flange. In the illustrated embodiment, the flange 46 of the first diverter valve 52 (e.g., previous diverter valve) is engaged with the housing 14 of the second diverter valve 54 (e.g., subsequent diverter valve), thereby coupling the diverter valves to one another. Threaded shafts are engaged with the threaded recesses of the housing 14 of the second diverter valve 54, and the threaded shafts extend through respective apertures 50 of the flange 46 of the first diverter valve 52. In addition, nuts 36 are engaged with the respective threaded shafts, thereby coupling the first diverter valve 52 to the second diverter valve 54. While the second longitudinal end of each housing is formed by a flange in the illustrated embodiment, in other embodiments, the second longitudinal end of at least one housing may be formed by another suitable surface/component. For example, in certain embodiments, the flange may be omitted, and threaded recesses may be formed at the second longitudinal end of the housing (e.g., within a body of the housing). In such embodiments, threaded rods may be engaged with the threaded recesses to couple the housing to the housing of a subsequent diverter valve or to a blind flange.

As previously discussed, each housing 14 includes a subsequent diverter valve outlet positioned at the second longitudinal end 22 of the housing, and the respective rotary element includes a subsequent diverter valve outlet fluidly coupled to (e.g., substantially aligned with) the subsequent diverter valve outlet of the housing. In certain embodiments, the subsequent diverter valve outlet of the housing is formed at the end of a subsequent diverter valve outlet flow path through the housing 14. The flow path may extend along the longitudinal axis 20 of the diverter valve 12/diverter valve assembly 10. However, in other embodiments, the subsequent diverter valve outlet flow path of at least one housing may extend along another suitable direction and/or route to the respective subsequent diverter valve outlet. For example, the subsequent diverter valve outlet flow path may extend along a curved path, the subsequent diverter valve outlet flow path may be angled relative to the longitudinal axis, the subsequent diverter valve outlet flow path may include multiple sections that are angled relative to one another, or a combination thereof.

Furthermore, in certain embodiments, each diverter valve 12 includes a second end cap disposed within the subsequent diverter valve outlet flow path of the housing 14. The second end cap is configured to block movement of the rotary element along the longitudinal axis 20 through the subsequent diverter valve outlet and to facilitate rotation of the rotary element about the longitudinal axis 20. In addition, the second end cap includes a flow passage extending from the subsequent diverter valve outlet of the rotary element to the subsequent diverter valve outlet of the housing. The flow passage is configured to direct fluid to flow from the subsequent diverter valve outlet of the rotary element to the subsequent diverter valve outlet of the housing. Furthermore, in certain embodiments, the second end cap may be omitted and movement of the rotary element through the subsequent diverter valve outlet of the housing may be blocked by other suitable device(s)/element(s) (e.g., a protrusion of the rotary element engaged with an annular recess in the housing along the subsequent diverter valve outlet flow path, an annular ridge extending inwardly from the subsequent diverter valve outlet flow path along the radial axis, etc.). In such embodiments, fluid may flow from the subsequent diverter valve outlet of the rotary element to the subsequent diverter valve outlet of the housing via the subsequent diverter valve outlet flow path of the housing.

As previously discussed, the blind flange 48 is coupled to the flange 46 of the second diverter valve 54. The blind flange 48 is configured to cover the subsequent diverter valve outlet of the housing 14, thereby substantially blocking fluid flow out of the subsequent diverter valve outlet of the second diverter valve 54. In the illustrated embodiment, threaded shafts extend through the apertures 50 of the flange 46 of the second diverter valve 54, and the threaded shafts extend through respective apertures 56 of the blind flange 48. In addition, first nuts 36 are engaged with first ends of the respective threaded shafts, and second nuts 58 are engaged with second ends of the respective threaded shafts, thereby coupling the flange 46 of the second diverter valve 54 to the blind flange 48. In embodiments in which threaded recesses are formed at the second longitudinal end of the housing of the second diverter valve (e.g., and the flange is omitted), the threaded rods may be engaged with the threaded recesses to couple the housing to the blind flange. In certain embodiments, a gasket may be disposed between the flange 46 of the housing 14 of the second diverter valve 54 and the blind flange 48 to substantially block fluid from flowing out of the interface between the flange 46 of the second diverter valve 54 and the blind flange 48. Furthermore, while a blind flange is used to block the subsequent diverter valve outlet of the housing in the illustrated embodiment, in other embodiments, another suitable blocking device (e.g., plug, seal, etc.) may be coupled to the housing to block the subsequent diverter valve outlet of the housing.

In the illustrated embodiment, each housing 14 has multiple threaded recesses 60 disposed about each destination outlet 24. Each threaded recess 60 is configured to receive a respective threaded shaft to facilitate coupling the housing 14 to a flange of a destination/fluid conduit to a destination. The flange may have multiple apertures, and the threaded shafts may extend through the apertures of the flange while the flange is engaged with the housing 14. A nut may be engaged with each threaded shaft to couple the flange to the housing 14. In the illustrated embodiment, the threaded recesses 60 are distributed about the respective destination outlet 24 in a circular pattern. However, in other embodiments, the threaded recesses may be arranged in any other suitable pattern (e.g., corresponding to the pattern of the apertures of the respective flange). Furthermore, while threaded recesses in the housing are used to couple the housing to the destination/fluid conduit to the destination in the illustrated embodiment, in other embodiments, other and/or additional connection system(s) may be used to couple the housing to the destination/fluid conduit to the destination. For example, in certain embodiments, the housing may include flange(s) positioned at one or more respective destination outlet(s), and the flange(s) may be configured to engage corresponding flange(s) of the destination(s)/fluid conduit(s) to the destination(s). Each flange may also be configured to engage a body of the destination.

In the illustrated embodiment, each housing 14 includes an annular recess 62 disposed about each destination outlet 24, in which each annular recess 62 is configured to receive a seal (e.g., O-ring, etc.). The seal is configured to substantially block fluid from flowing out of the interface between the housing and the respective destination/fluid conduit to the destination. While an annular recess 62 is disposed about each destination outlet 24 in the illustrated embodiment, in other embodiments, at least one annular recess may be omitted. Furthermore, in certain embodiments, for at least one destination outlet, a gasket may be disposed about the destination outlet 24 between the housing and the respective destination/fluid conduit to the destination (e.g., alone or in combination with the seal disposed within the annular recess) to substantially block fluid from flowing out of the interface between the housing and the destination/fluid conduit to the destination.

During operation of the diverter valve assembly 10 (e.g., during fracking operations, etc.), fluid (e.g., fracking fluid, etc.) enters the inlet 16 of the housing 14 of the first diverter valve 52 and flows to the inlet of the rotary element of the first diverter valve 52. A first portion of the fluid flows through the target destination outlet of the rotary element to a selected destination outlet 24 of the housing 14 of the first diverter valve 52. The first portion of the fluid then flows through the selected destination outlet 24 of the housing 14 to the target destination (e.g., via a conduit extending between the selected destination outlet 24 and the target destination). As previously discussed, the rotary element is configured to rotate about the longitudinal axis 20 to selectively fluidly couple (e.g., align) the target destination outlet of the rotary element with a selected destination outlet 24 of the housing 14, thereby enabling the fluid to flow to the selected target destination. A second portion of the fluid entering the inlet of the rotary element is directed through the rotary element along the longitudinal axis 20 to the subsequent diverter valve outlet of the rotary element. The second portion of the fluid then flows through the subsequent diverter valve outlet of the housing 14 of the first diverter valve 52 to the inlet of the housing 14 of the second diverter valve 54.

From the inlet of the housing of the second diverter valve, the fluid flows to the inlet of the rotary element of the second diverter valve. The fluid then flows through the target destination outlet of the rotary element of the second diverter valve to a selected destination outlet 24 of the housing 14 of the second diverter valve 54. From the selected destination outlet 24 of the housing 14, the fluid flows to the target destination (e.g., via a conduit extending between the selected destination outlet 24 and the target destination). As previously discussed, the rotary element is configured to rotate about the longitudinal axis 20 to selectively fluidly couple (e.g., align) the target destination outlet of the rotary element with a selected destination outlet 24 of the housing 14, thereby enabling the fluid to flow to the selected target destination. Flow of the fluid out of the subsequent diverter valve outlet of the housing 14 of the second diverter valve 54 is blocked by the blind flange 48.

Because the illustrated diverter valve assembly 10 includes two diverter valves 12, fluid entering the inlet 16 of the housing 14 of the first diverter valve 52 may be directed to a first selected target destination among the destinations fluidly coupled to the destination outlets 24 of the first diverter valve 52 and to a second selected target destination among the destinations fluidly coupled to the destination outlets 24 of the second diverter valve 54. In certain embodiments, the rotary element of at least one diverter valve may be rotated to a position that aligns the target destination outlet of the rotary element with a solid portion of the housing, thereby blocking fluid flow to all of the destinations fluidly coupled to the destination outlets of the diverter valve. Furthermore, in certain embodiments, the rotary element may include multiple target destination outlets (e.g., less than the number of destination outlets of the respective housing). In such embodiments, the target destination outlets of the rotary element may be fluidly coupled to (e.g., substantially aligned with) multiple destination outlets of the respective housing to enable the fluid to flow to multiple selected target destinations.

Because the subsequent diverter valve outlet of the housing of a previous diverter valve may be fluidly coupled to the inlet of the housing of a subsequent diverter valve, the diverter valve assembly may include any suitable number of diverter valves, in which multiple destinations are fluidly coupled to each diverter valve. For example, in the illustrated embodiment, the diverter valve assembly includes two diverter valves. However, in other embodiments, the diverter valve assembly may include 1, 3, 4, 5, 6, 7, 8, or more diverter valves. For example, in a diverter valve assembly having a single diverter valve, the blind flange may be coupled to the flange of the single diverter valve. Because the diverter valve assembly may include any suitable number of diverter valves, the diverter valve assembly may be used in various applications/systems having varying numbers of destinations. As a result, the design and manufacturing costs of the diverter valve assembly may be significantly reduced, as compared to particularly designing a different diverter valve/diverter valve assembly for each application/system. In addition, because each diverter valve within the diverter valve assembly may be substantially the same, the design and manufacturing costs may be further reduced.

Figure 2:
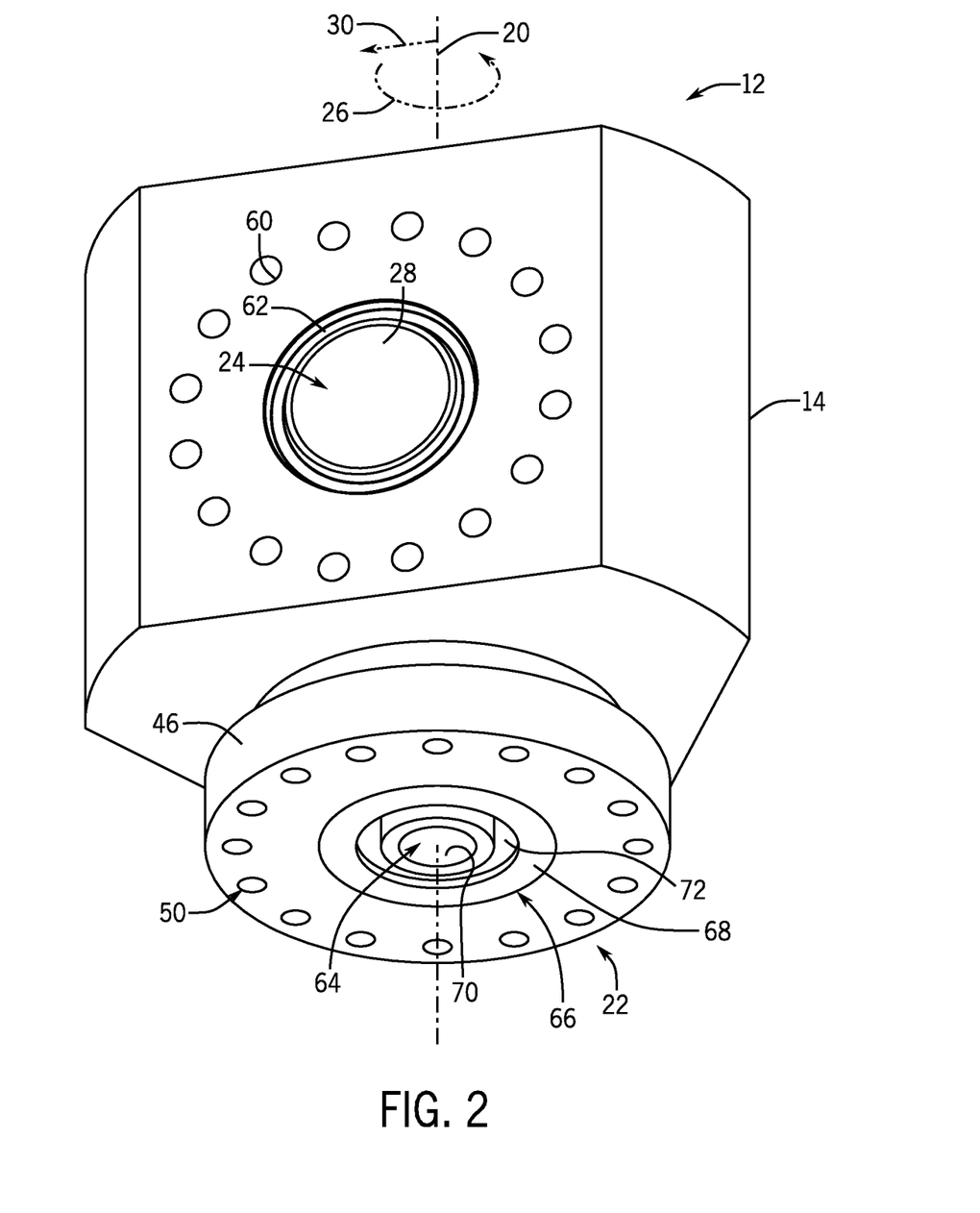
FIG. 2 is a bottom perspective view of a portion of a diverter valve of the diverter valve assembly of FIG. 1.

FIG. 2 is a bottom perspective view of a portion of a diverter valve 12 of the diverter valve assembly of FIG. 1. As previously discussed, the housing 14 includes a subsequent diverter valve outlet 64 positioned at the second longitudinal end 22 of the housing, and the rotary element includes a subsequent diverter valve outlet fluidly coupled to (e.g., substantially aligned with) the subsequent diverter valve outlet 64 of the housing 14. In the illustrated embodiment, the subsequent diverter valve outlet 64 of the housing is formed at the end of a subsequent diverter valve outlet flow path 66 through the housing 14. In the illustrated embodiment, the flow path extends along the longitudinal axis 20 of the diverter valve 12/diverter valve assembly. However, in other embodiments, the subsequent diverter valve outlet flow path may extend along another suitable direction and/or route to the respective subsequent diverter valve outlet. For example, the subsequent diverter valve outlet flow path may extend along a curved path, the subsequent diverter valve outlet flow path may be angled relative to the longitudinal axis, the subsequent diverter valve outlet flow path may include multiple sections that are angled relative to one another, or a combination thereof.

In the illustrated embodiment, the diverter valve 12 includes a second end cap 68 disposed within the subsequent diverter valve outlet flow path 66 of the housing 14. The second end cap 68 is configured to block movement of the rotary element along the longitudinal axis 20 through the subsequent diverter valve outlet 64 and to facilitate rotation of the rotary element about the longitudinal axis 20. In addition, the second end cap 68 includes a flow passage 70 extending from the subsequent diverter valve outlet of the rotary element to the subsequent diverter valve outlet 64 of the housing 14. The flow passage 70 is configured to direct fluid to flow from the subsequent diverter valve outlet of the rotary element to the subsequent diverter valve outlet 64 of the housing 14. In the illustrated embodiment, the second end cap 68 has an annular recess 72 configured to receive a seal (e.g., O-ring, etc.). The seal is configured to substantially block fluid from flowing out of the interface between the housing 14 (e.g., the flange 46 of the housing 14) and the housing of the subsequent diverter valve or the blind flange. While the second end cap 68 includes the annular recess 72 in the illustrated embodiment, in other embodiments, the annular recess may be omitted. Furthermore, in certain embodiments, a gasket may be disposed between the housing (e.g., the flange of the housing) and the housing of the subsequent diverter valve or the blind flange (e.g., alone or in combination with the seal disposed within the annular recess of the second end cap) to substantially block fluid from flowing out of the interface between the housing (e.g., the flange of the housing) and the housing of the subsequent diverter valve or the blind flange. Furthermore, in certain embodiments, the second end cap may be omitted and movement of the rotary element through the subsequent diverter valve outlet of the housing may be blocked by other suitable device(s)/element(s) (e.g., a protrusion of the rotary element engaged with an annular recess in the housing along the subsequent diverter valve outlet flow path, an annular ridge extending inwardly from the subsequent diverter valve outlet flow path along the radial axis, etc.). In such embodiments, fluid may flow from the subsequent diverter valve outlet of the rotary element to the subsequent diverter valve outlet of the housing via the subsequent diverter valve outlet flow path of the housing.

Figure 3:
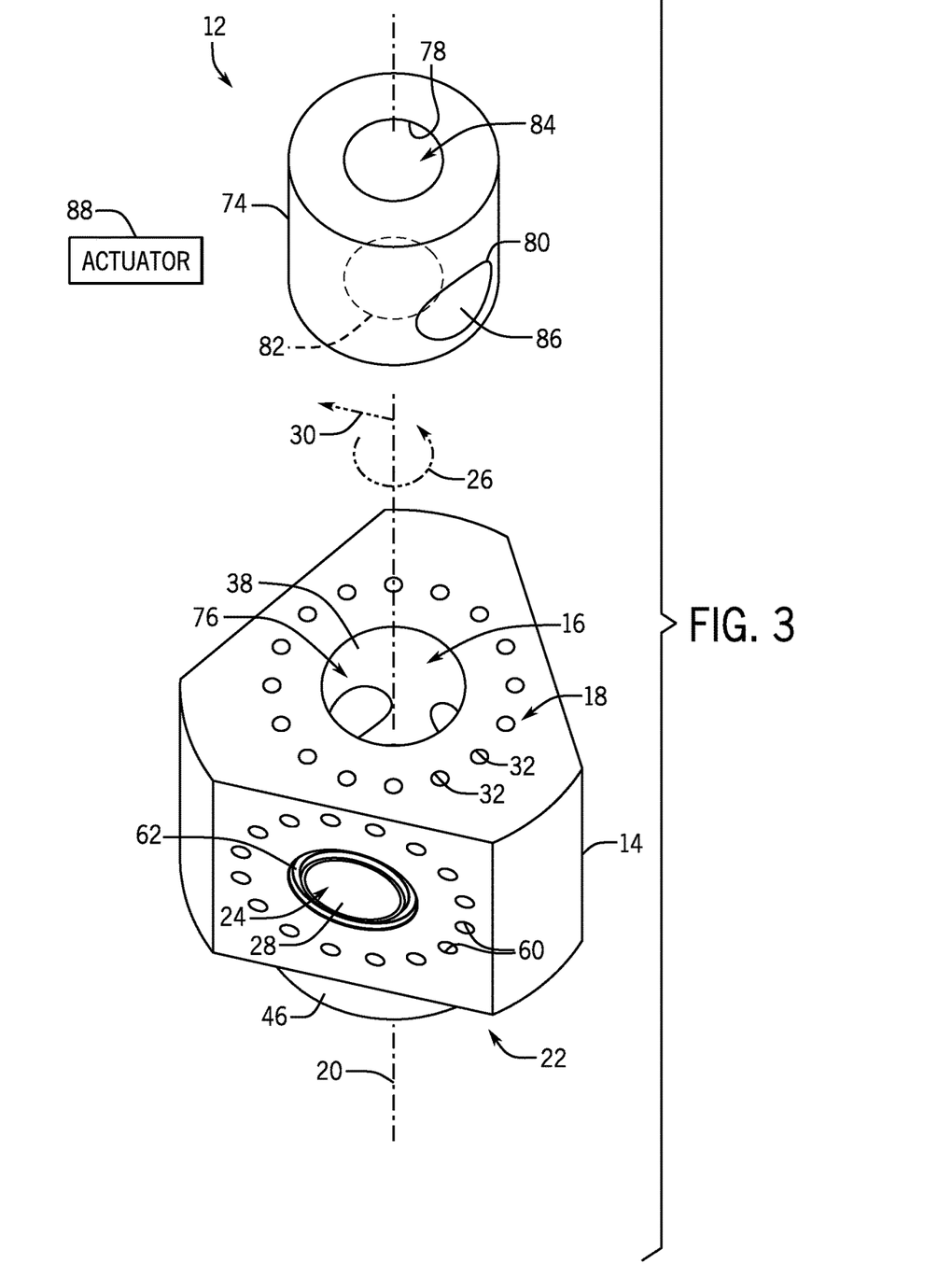
FIG. 3 is an exploded perspective view of a portion of a diverter valve of the diverter valve assembly of FIG. 1.

FIG. 3 is an exploded perspective view of a portion of a diverter valve 12 of the diverter valve assembly of FIG. 1. As previously discussed, the diverter valve 12 includes the rotary element 74 configured to be disposed within the housing 14, such as within a central cavity 76 of the housing 14. As illustrated, the cavity 76 extends through the housing 14 from the inlet 16 to the subsequent diverter valve outlet along the longitudinal axis 20. The cavity 76 includes the inlet flow path 38 and the subsequent diverter valve outlet flow path. In addition, each destination flow path 28 extends to the cavity 76, thereby fluidly coupling the respective destination outlet 24 to the cavity 76.

Furthermore, the rotary element 74 has an inlet 78, a target destination outlet 80, and a subsequent diverter valve outlet 82. The inlet 78 and the subsequent diverter valve outlet 82 are fluidly coupled via a cavity 84 extending through the rotary element 74 along the longitudinal axis 20.

In addition, the target destination outlet 80 is formed at the end of a target destination flow path 86, which extends from the cavity 84. Accordingly, the target destination flow path 86 fluidly couples the target destination outlet 80 to the cavity 84. The inlet 78 of the rotary element 74 is configured to fluidly couple to (e.g., align with) the inlet 16 of the housing 14, and the subsequent diverter valve outlet 82 of the rotary element 74 is configured to fluidly couple to (e.g., align with) the subsequent diverter valve outlet of the housing 14. Furthermore, the rotary element 74 is configured to rotate about the longitudinal axis 20 to selectively fluidly couple (e.g., align) the target destination outlet 80 with a respective destination outlet 24 of the housing 14. While the illustrated rotary element 74 has a single target destination outlet 80 in the illustrated embodiment, in other embodiments, the rotary element may include multiple target destination outlets.

In the illustrated embodiment, the diverter valve 12 has an actuator 88 configured to drive the rotary element 74 to rotate. In certain embodiments, each diverter valve of the diverter valve assembly includes a respective actuator to facilitate independent control of the respective rotary elements. However, in other embodiments, the diverter valve assembly may include an actuator configured to drive multiple rotary elements (e.g., all of the rotary elements of the diverter valve assembly) to rotate together. The actuator 88 may include any suitable device(s) configured to drive the rotary element 74 to rotate, such as a hydraulic motor, a pneumatic motor, a worm gear, a linear actuator, a hydraulic cylinder, a pneumatic cylinder, a gear assembly, a belt, a chain, a wheel, a sprocket, another suitable driving element, another suitable movement redirection element, or a combination thereof. For example, in certain embodiments, the actuator may include a hydraulic motor coupled to the housing and a worm gear extending through the housing from the hydraulic motor to the rotary element. By way of further example, a protrusion may be coupled to the rotary element, and the protrusion may extend through a slot in the housing. A hydraulic cylinder of the actuator may be coupled to the protrusion and configured to drive the rotary element to rotate. Furthermore, in certain embodiments, the actuator may include a handle coupled to the rotary element (e.g., and extending through the housing) to facilitate manual rotation of the rotary element.

While each outlet and flow path/passage of the diverter valve assembly disclosed above with reference to FIGS. 1-3 has a circular shape/cross-section in the illustrated embodiment, in other embodiments, at least one outlet and/or flow path/passage may have another suitable shape/cross-sectional shape (e.g., polygonal, elliptical, etc.). Furthermore, the diverter valve assembly disclosed above with reference to FIGS. 1-3 may be used for various oil and gas applications, such as controlling the flow path of fracking fluid. The diverter valve assembly disclosed above with reference to FIGS. 1-3 may also be used for any other suitable application to control a fluid flow path through a system. In addition, while each diverter valve includes a single rotary element in the illustrated embodiment, in other embodiments, at least one diverter valve may include multiple rotary elements (e.g., arranged along a longitudinal axis and longitudinally aligned with a respective set of housing destination outlet passages).

In addition, while the inlet and the subsequent diverter valve outlet are positioned at respective longitudinal ends of each housing and each rotary element in the illustrated embodiment, in other embodiments, the inlet and/or the subsequent diverter valve outlet of at least one housing and/or at least one rotary element may be positioned in another suitable location. For example, in certain embodiments, the inlet and/or the subsequent diverter valve outlet of at least one rotary element may be positioned along a circumferential surface of the rotary element (e.g., in which the inlet/subsequent diverter valve outlet is fluidly coupled to an annular cavity within the housing). Furthermore, in certain embodiments, the housing of at least one diverter valve may have a shape (e.g., curved, angled, etc.) that establishes any suitable angle between the inlet and subsequent diverter valve outlet (e.g., the respective inlet flow path and the respective subsequent diverter valve outlet flow path may be angled relative to one another). Furthermore, while each rotary element is configured to rotate about the longitudinal axis of the respective diverter valve/diverter valve assembly in the illustrated embodiment, in other embodiments, at least one rotary element may be configured to rotate about another suitable axis. In addition, while the diverter valve housings are configured to be aligned with one another along the longitudinal axis of the diverter valve assembly in the illustrated embodiment, in other embodiments, at least two housings may be offset from one another and/or angled relative to one another, thereby establishing a local longitudinal axis for each diverter valve. In certain embodiments, the subsequent diverter valve outlet of the housing of a previous diverter valve may be fluidly coupled to the inlet of the housing of a subsequent diverter valve with a conduit/hose.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A diverter valve, comprising:
a housing having an inlet, a plurality of destination outlets, and a subsequent diverter valve outlet;
a rotary element disposed within the housing, wherein the rotary element has an inlet, one or more target destination outlets, and a subsequent diverter valve outlet; and
an end cap configured to block movement of the rotary element through the inlet of the housing, wherein the end cap has an annular recess configured to receive a seal;
wherein the inlet of the rotary element is fluidly coupled to the inlet of the housing, the subsequent diverter valve outlet of the rotary element is fluidly coupled to the subsequent diverter valve outlet of the housing, and the rotary element is configured to rotate to selectively fluidly couple the one or more target destination outlets of the rotary element to one or more respective destination outlets of the plurality of destination outlets of the housing.

2. The diverter valve of claim 1, wherein the inlet of the housing is positioned at a first longitudinal end of the housing, and the subsequent diverter valve outlet of the housing is positioned at a second longitudinal end of the housing, opposite the first longitudinal end.

3. The diverter valve of claim 2, wherein the plurality of destination outlets of the housing are disposed circumferentially about a longitudinal axis of the diverter valve, and the rotary element is configured to rotate about the longitudinal axis.

4. The diverter valve of claim 1, wherein the housing has an annular recess disposed about a respective destination outlet of the plurality of destination outlets of the housing, and the annular recess is configured to receive a seal.

5. The diverter valve of claim 1, comprising a flange forming an end of the housing, wherein the subsequent diverter valve outlet of the housing is positioned at the end.

6. A diverter valve, comprising:
a housing having an inlet, a plurality of destination outlets, a subsequent diverter valve outlet, and a cavity, wherein the cavity extends through the housing from the inlet to the subsequent diverter valve outlet, and each destination outlet of the plurality of destination outlets is fluidly coupled to the cavity via a respective destination flow path; and
a rotary element disposed within the cavity of the housing, wherein the rotary element has an inlet, one or more target destination outlets, a subsequent diverter valve outlet, and a cavity;
wherein the inlet of the rotary element is fluidly coupled to the inlet of the housing, the subsequent diverter valve outlet of the rotary element is fluidly coupled to the subsequent diverter valve outlet of the housing, a number of the one or more target destination outlets of the rotary element is less than a number of the plurality of destination outlets of the housing, the inlet of the rotary element is fluidly coupled to the subsequent diverter valve outlet of the rotary element via the cavity of the rotary element, each target destination outlet of the one or more target destination outlets of the rotary element is fluidly coupled to the cavity of the rotary element via a respective target destination flow path, and the rotary element is configured to rotate to selectively fluidly couple the one or more target destination outlets of the rotary element to one or more respective destination outlets of the plurality of destination outlets of the housing; and
wherein the inlet of the housing is positioned at a first longitudinal end of the housing, the subsequent diverter valve outlet of the housing is positioned at a second longitudinal end of the housing, opposite the first longitudinal end, the cavity of the housing extends along a longitudinal axis of the diverter valve from the inlet of the housing to the subsequent diverter valve outlet of the housing, the plurality of destination outlets of the housing are disposed circumferentially about the longitudinal axis, and the rotary element is configured to rotate about the longitudinal axis.

7. The diverter valve of claim 6, comprising an end cap configured to block movement of the rotary element through the inlet of the housing.

8. The diverter valve of claim 7, wherein the end cap has an annular recess configured to receive a seal.

9. The diverter valve of claim 6, comprising a blocking device configured to block the subsequent diverter valve outlet of the housing.

10. The diverter valve of claim 6, wherein the housing has an annular recess disposed about a respective destination outlet of the plurality of destination outlets of the housing, and the annular recess is configured to receive a seal.

11. The diverter valve of claim 6, wherein the inlet of the rotary element is aligned with the inlet of the housing along a longitudinal axis of the rotary element, and the subsequent diverter valve outlet of the rotary element is aligned with the subsequent diverter valve outlet of the housing along the longitudinal axis.

12. A diverter valve assembly, comprising:
a first diverter valve, comprising:
a first housing having an inlet, a plurality of destination outlets, and a subsequent diverter valve outlet; and
a first rotary element disposed within the first housing, wherein the first rotary element has an inlet, one or more target destination outlets, and a subsequent diverter valve outlet;
wherein the inlet of the first rotary element is fluidly coupled to the inlet of the first housing, the subsequent diverter valve outlet of the first rotary element is fluidly coupled to the subsequent diverter valve outlet of the first housing, a number of the one or more target destination outlets of the first rotary element is less than a number of the plurality of destination outlets of the first housing, and the first rotary element is configured to rotate to selectively fluidly couple the one or more target destination outlets of the first rotary element to one or more respective destination outlets of the plurality of destination outlets of the first housing; and
wherein the inlet of the first housing is positioned at a first longitudinal end of the first housing, the subsequent diverter valve outlet of the first housing is positioned at a second longitudinal end of the first housing, opposite the first longitudinal end of the first housing, the plurality of destination outlets of the first housing are disposed circumferentially about a longitudinal axis of the diverter valve assembly, and the first rotary element is configured to rotate about the longitudinal axis; and
a second diverter valve, comprising:
a second housing having an inlet, a plurality of destination outlets, and a subsequent diverter valve outlet, wherein the inlet of the second housing is fluidly coupled to the subsequent diverter valve outlet of the first housing; and
a second rotary element disposed within the second housing, wherein the second rotary element has an inlet, one or more target destination outlets, and a subsequent diverter valve outlet;
wherein the inlet of the second rotary element is fluidly coupled to the inlet of the second housing, the subsequent diverter valve outlet of the second rotary element is fluidly coupled to the subsequent diverter valve outlet of the second housing, a number of the one or more target destination outlets of the second rotary element is less than a number of the plurality of destination outlets of the second housing, and the second rotary element is configured to rotate to selectively fluidly couple the one or more target destination outlets of the second rotary element to one or more respective destination outlets of the plurality of destination outlets of the second housing; and
wherein the inlet of the second housing is positioned at a first longitudinal end of the second housing, the subsequent diverter valve outlet of the second housing is positioned at a second longitudinal end of the second housing, opposite the first longitudinal end of the second housing, the plurality of destination outlets of the second housing are disposed circumferentially about the longitudinal axis, and the second rotary element is configured to rotate about the longitudinal axis.

13. The diverter valve assembly of claim 12, comprising a blocking device configured to block the subsequent diverter valve outlet of the second housing.

14. The diverter valve assembly of claim 12, wherein the first diverter valve comprises a flange forming an end of the first housing, the subsequent diverter valve outlet of the first housing is positioned at the end, and the flange is coupled to the second housing.

15. The diverter valve assembly of claim 12, wherein the first housing has a first annular recess disposed about a respective destination outlet of the plurality of destination outlets of the first housing, the second housing has a second annular recess disposed about a respective destination outlet of the plurality of destination outlets of the second housing, or a combination thereof.

16. The diverter valve assembly of claim 12, wherein the first diverter valve comprises a first end cap configured to block movement of the first rotary element through the inlet of the first housing, and the second diverter valve comprises a second end cap configured to block movement of the second rotary element through the inlet of the second housing.

17. The diverter valve assembly of claim 16, wherein the first end cap has an annular recess configured to receive a first seal, and the second end cap has an annular recess configured to receive a second seal.

* * * * *